3,097,140
PREPARING A MIXED POLIO, PERTUSSIS, TETANUS, AND DIPHTHERIA VACCINE WITH BENZETHONIUM CHLORIDE
Lee F. Schuchardt, North Wales, Pa., assignor to Merck & Co., Inc., Rahway, N.J., a corporation of New Jersey
No Drawing. Filed Oct. 31, 1958, Ser. No. 770,905
7 Claims. (Cl. 167—78)

This invention relates to antigen products and methods of preparing the same. More particularly, the invention relates to a combined poliomyelitis-diphtheria-tetanus-pertussis antigen product and to methods for preparing the same.

It is well known that poliomyelitis is a virus disease, and that it may be combated by preventing the occurrence of the disease, using injections of killed poliomyelitis viruses of types 1, 2 and 3. This poliomyelitis vaccine is, like many other vaccines, a sterile liquid, and conventionally contains a preservative so that multiple dose vials will remain sterile over the entire period of use. One preservative, benzethonium chloride, has been disclosed in the U.S. Patent to McLean, No. 2,793,160, granted May 21, 1957.

The practice of using combined diphtheria, purtussis and tetanus antigens is well established, and the efficiency of such combination in pediatric practice has been discussed by Ipsen and Bowen in A.J.P.H., 45, 3:312–318 (March 1955). The combined diphtheria, pertussis and tetanus antigens are conventionally preserved by thimerosal, which is sodium ethyl mercuri thiosalicylate. The thimerosal has been utilized conventionally in quantities of 1:10,000. One method of making the combined diphtheria, pertussis and tetanus antigens is disclosed in the patent to Pillemer No. 2,528,972. In the specification herein, wherever reference is made to the preparation of this combination, it may be assumed that it is prepared in accordance with the disclosure of the aforementioned Pillemer patent, although it may also be prepared in a variety of other ways.

Normally, glycine is used as a vehicle for the concentrated diphtheria fluid and the tetanus toxoid fluid.

In the conventional method of making diphtheria-tetanus-pertussis antigen, the tetanus toxoid in the form of a clear amber solution is subjected to the addition of potassium alum, dropping the pH to a value of about 4–5, and glycine is added, producing cloudiness but no precipitate. Sodium hydroxide is added in order to precipitate aluminum hydroxide, and the toxoid is absorbed on the precipitate.

Similarly, the diphtheria toxoid is added to alum and glycine, together with sodium hydroxide treatment as heretofore reported in connection with the tetanus toxoid, producing aluminum hydroxide gel. In order to form the final three-component mixture, the two aluminum hydroxide gel products are mixed together and the pertussis cell suspension is added. Each of the components, prior to admixture, conventionally contains about one part in ten thousand of sodium ethyl mercurithiosalicylate.

Alum-precipitated diphtheria-pertussis-tetanus antigen, in combination with alum precipitated poliomyelitis vaccine, has now been found to be highly desirable, because it produces a four-component antigen which can readily be administered in a single dosage. However, a problem arose in discovering an agent which would kill the pertussis, and serve as a preservative in the four-component poliomyelitis-diphtheria-tetanus-pertussis antigen, which would not either destroy the aluminum hydroxide gel or inactivate the polio component. It has been discovered, in accordance with the foregoing disclosure, that the four way combination may be coupled with approximately 1:20,000 to 1:50,000 parts of benzethonium chloride with excellent results.

Attempts were made to add versene (ethylenediamine-tetra acetic acid) to the diphtheria-pertussis-tetanus antigen containing thimerosal, thus sequestering the copper which, when the polio vaccine is added, would destroy the activity of polio in the combined antigen. Such attempts failed because the versene was found to sequester the alum preferentially, thus destroying the beneficial effects contributed by the alum in the three-component antigen. It has now been found, however, that benzethonium chloride accomplishes the killing of pertussis, and stabilization of the four-component mixture, without interfering in any way with the gel properties of the vaccine.

It is an object of this invention to provide a novel combined antigen for poliomyelitis, diphtheria, tetanus and pertussis, which remains safely free from contaminating bacteria, molds and fungi for an extended period of use. It is a further object of this invention to provide a combined poliomyelitis-diphtheria-tetanus-pertussis vaccine wherein the effectiveness of at least one of the aforementioned components is greater in the overall combination that it is in its individual form.

Still another object of this invention is to provide a novel method of preparing a combined poliomyelitis-diphtheria-tetanus-pertussis antigen.

Other objects and advantages of this invention will further become apparent hereinafter.

In accordance with the practice of this invention, the four-component antigen is prepared in a novel manner, incorporating benzethonium chloride which serves several cooperative functions, as will further appear. Chemically, benzethonium chloride is known as benzyldimethyl 2-(2 p-1,1,3,3-tetramethylbutylphenoxy ethoxy)-ethyl ammonium chloride monohydrate:

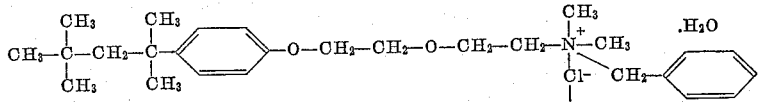

The preferred products of this invention contain benzethonium chloride in a concentration in the range from 1:20,000 to 1:50,000.

In accordance with this invention, the concentrated diphtheria toxoid in lyophile form is diluted with sterile distilled water to a volume equal to approximately one-half of the original concentrate volume. The restored toxoid is filtered, the filter pads are washed, and the wash collected and cooled with the filtrate which contains the toxoid. The toxoid is tested for sterility. A 1% solution of benzethonium chloride is then added to the diluted toxoid, to contain benzethonium chloride in a concentration of 1:40,000.

The concentrated tetanus toxoid in lyophile form is restored to one-half the original concentrate volume with sterile distilled water. A 1% solution of benzethonium chloride is then added to the diluted toxoid, to contain benzethonium chloride in a concentration of 1:40,000. The restored toxoid is then cleared by filtration and sterilized by filtration. The filtered toxoid is then tested for sterility.

The diphtheria and tetanus toxoids are brought to a temperature of 20°–22° C., the amounts of sterile toxoid concentrates to be added are calculated, based on $L_f$ values, so that the final product contains 25 $L_f$/ml. of diphtheria toxoid and 10 $L_f$/ml. of tetanus toxoid. The calculated amounts are added to a reactor vessel in a sterile manner and thoroughly mixed.

Poliomyelitis vaccine is brought to a temperature of 20°–22° C., and the amount of vaccine to be added is calculated so that the final product will contain no less than 0.90 ml. of poliomyelitis vaccine per ml. of product. The calculated amount of poliomyelitis vaccine is then added to the reactor tank in a sterile manner. The combined antigens are agitated thoroughly to insure a uniform mixture.

To the combined antigens is added a 10% potassium alum solution so that the mixture contains 0.1 mg. of potassium alum per $L_f$ of toxoid. The addition is made in a steril manner, with constant agitation to insure immediate dispersal of alum solution. At this point the product has a bright yellow color.

A 10 ml. sample is removed in a sterile manner and titrated to pH 7.1–7.2 with 0.01 N NaOH. Based upon the result of this titration the amount of 10 N NaOH required to adjust the bulk of pH 7.1–7.2 is calculated. This amount of 10 N NaOH is added in a sterile manner and the suspension is thoroughly mixed. The pH value of the mixture is determined. If necessary, additional NaOH is added. The product at this point is brick red. On standing, a white precipitate forms leaving a red supernatant liquid. Benzethonium chloride solution (1%) is then added to provide a final concentration of 1:40,000 parts benzethonium chloride.

The mixture can be incubated at 35°–37° C. for 16–24 hours.

Pertussis concentration is warmed to 20°–22° C. before mixing. Sufficient concentrate is added to provide not more than 16 opacity units per ml. in the final product. The addition is made in a sterile manner with constant agitation to insure proper mixing of pertussis with toxoid and polio precipitates. Physiological saline solution is added in a sterile manner with constant agitation, should dilution be required.

The product is then tested for sterility, and is subjected to diphtheria and tetanus antigenicity tests, pertussis toxicity and potency tests, animal safety tests, and polio potency and safety tests, and assayed for formalin.

The pertussis concentrate was prepared and heat detoxified prior to its incorporation into the mixture. Heat detoxification may be accomplished, for example, by heating at 56° C. for 30 minutes. By varying the time and the temperature, a lower temperature may be utilized, but in any event in heat detoxifing pertussis the temperature should not be increased to a value above about 56° C.

The aluminum hydroxide precipitate provides a co-adsorption of tetanus, diphtheria, and polio, preferably at room temperature.

Benzethonium chloride is added either before or after the co-adsorption period. The pertussis concentrate, heat detoxified, is simply mixed in the prescribed quantity with the mixture of the other three components prepared as just described.

It will accordingly be seen that the technique of preparation of the four-component composition in accordance with this invention differs sharply from prior techniques, in that polio vaccine is used as a diluent. This invention provides a novel and highly useful method of providing all four dosages into a single injectable solution, by using the polio vaccine itself as a diluent.

As an alternate form of the invention, pre-formed aluminum phosphate precipitate may be employed as a co-adsorbing agent. In accordance with such process, the tetanus and poliomyelitis components are mixed with the pre-formed precipitate. Benzethonium chloride is added and the mixture is retained at room temperature for about 5 to 7 days, co-adsorbing the tetanus and poliomyelitis components. The diphtheria and pertussis components are then added.

Alumina gel, as referred to herein, is a gelatinous aluminum compound or substance such as aluminum hydroxide, aluminum phosphate, or the equivalent which adsorbs the four components when mixed together in a common container.

Several lots of four-component antigen co-precipitated in accordance with this invention were tested. All of the preparations met the National Institutes of Health minimum requirements for both diphtheria and tetanus potency. The responses elicited to both toxoids by the quadruple vaccine were at least equivalent to those produced by the triple vaccine.

Simultaneous potency tests for pertussis were performed on several lots of the four-component antigen and on the three component diphtheria-tetanus-pertussis antigen from which they were prepared. All of the preparations met the National Institutes of Health minimum requirements for pertussis potency.

The four-component preparations in accordance with the invention, and their poliomyelitis vaccine components individually, were assayed for polio potency.

All of the foregoing tests produced results which are reported in the following tables. It is particularly pertinent to observe the increased response of the four-component mixture as compared to its corersponding poliomyelitis vaccine, as shown in Table 3. In every instance, except the type I components of lots A and D, the four-component preparations gave a better polio response than the poliomyelitis vaccine alone. This increased response by the combined antigens (referred to in the tables as vaccine) is highly significant. In lot A, where the type III component of the poliomyelitis antigen was poor, it will be observed that there does not appear to be any enhancement of the combined vaccines. Otherwise, the degree of enhancement is clear.

TABLE 1

*Potency Tests of Diphtheria and Tetanus Toxoids*

1.5 ml. of vaccine was injected subcutaneously into 9 or 10 normal guinea pigs weighing 500 grams ±10%. The animals were bled after 4 weeks, and the serum pools were titrated for antitoxin by mixing with the appropriate test toxin and injecting the mixture into 2 guinea pigs.

| Lot No. | Diphtheria | | Tetanus | |
|---|---|---|---|---|
| | Combined diphtheria-pertussis-tetanus-poliomyelitis vaccine | Combined diphtheria-pertussis-tetanus vaccine | Combined diphtheria-pertussis-tetanus-poliomyelitis vaccine | Combined diphtheria-pertussis-tetanus vaccine |
| A | 1 3 | — | 5 | — |
| B | 4 | 4 | 8 | 7 |
| C | 4 | 4 | 5 | 7 |
| D | 3 | 3 | 5 | 8 |
| E | 4 | 4 | 8 | 5 |
| F | 2 | 3 | 6 | 8 |
| G | 4 | 4 | 4 | 3 |
| H | 2 | — | 2 | — |
| I | 2 | 2 | 5 | — |
| J | 2 | — | 5 | 4 |
| K | 4 | — | 2 | — |

[1] Antitoxin units per ml. (NIH requirements: 2 units.)

TABLE 2

*Summary of Pertussis Potency Tests*

Mice were injected with graded doses of vaccine and 14 days later challenged intracranially with 100T organisms of H. pertussis (strain 18–323).

| Lot No. | Combined diphtheria-pertussis-tetanus-poliomyelitis vaccine | Combined diphtheria-pertussis-tetanus vaccine | Pertussis concentrate |
|---|---|---|---|
| A | [1] 42.6 |  | 22.4 |
| B | 21.5, 9.5 | 22.2 | 20.8 |
| C | 14.2 | 22.2 | 20.8 |
| D | 17.6 | 18.3 | 14.4 |
| E | 20.5 | 22.7 | 9.3 |
| F | 24.5, 10.3 | 18.4, 9.2 | 6.7, 11.2 |
| G | 22 | 12 | 28, 17, 23 |
| H | 15 |  | 14 |
| I | 7, 15.5, 12 | 10 | 11 |
| J | 40 |  | 58 |
| K | 10 |  | 17 |

[1] Protective units per total human dose (NIH requirements: 8.0–36 units).

again after 6 and 12 months' storage at 2–5° C. The results of these tests (Table 5) show that the toxoid components of the four-component vaccine are stable for at least 12 months when held at 2–5° C.

Samples of four lots of the four-component antigen and their control, combined diphtheria-pertussis-tetanus antigen, were tested for pertussis potency after storage at 2–5° C. for periods up to 12 months. The results summarized in Table 6 show that in the four component antigen the pertussis potency has not changed significantly. We may conclude that the pertussis component is stable for at least 8–12 months when held at 2–5° C.

Three lots of the four-component antigen and the poliomyelitis vaccines from which they were prepared were stored at 2–5° C. The products were potency tested in monkeys at the time of their preparation and again approximately one year later. The results summarized in Table 7 show that all three lots still exceeded the minimum requirements.

TABLE 3

*Summary of Potency Tests in Monkeys on Poliomyelitis Vaccine*

| Lot No. | Antigen | Type I | | Type II | | Type III | |
|---|---|---|---|---|---|---|---|
| A | Combined diphtheria-pertussis-tetanus-poliomyelitis-vaccine | [1] 0.67 | | 1.52 | | 0.08 | |
|  | Polio vaccine | 0.72 | | 1.03 | | 0.06 | |
|  | Increase | (0.05) | | 0.49 | | 0.02 | |
| B | Combined diphtheria-pertussis-tetanus-poliomyelitis vaccine | 0.81 | | 4.92 | | 0.43 | |
|  | Polio vaccine | 0.76 | | 2.14 | | 0.41 | |
|  | Increase | 0.04 | | 2.78 | | 0.02 | |
| C | Combined diphtheria-pertussis-tetanus-poliomyelitis vaccine | 0.71 | | 4.28 | | 1.52 | |
|  | Polio vaccine | 0.33 | | 0.61 | | 0.38 | |
|  | Increase | 0.38 | | 3.67 | | 1.14 | |
| D | Combined diphtheria-pertussis-tetanus-poliomyelitis vaccine | 0.31 | 0.29 | 1.74 | 1.63 | 1.86 | 1.41 |
|  | Polio vaccine | 1.51 | 0.81 | 1.74 | 0.76 | 1.63 | 1.07 |
|  | Increase | (1.20) | (0.52) | 0 | 0.87 | 0.23 | 0.34 |
| E | Combined diphtheria-pertussis-tetanus-poliomyelitis vaccine | 0.54 | | 2.46 | | 1.23 | |
|  | Polio vaccine | 0.33 | | 0.61 | | 0.38 | |
|  | Increase | 0.21 | | 1.85 | | 0.85 | |
| F | Combined diphtheria-pertussis-tetanus-poliomyelitis vaccine | 1.41 | 1.07 | 2.14 | 4.28 | 4.00 | 2.14 |
|  | Polio vaccine | 0.93 | 0.35 | 1.07 | 1.00 | 0.62 | 0.31 |
|  | Increase | 0.46 | 0.72 | 1.07 | 3.28 | 3.38 | 1.83 |
| G | Combined diphtheria-pertussis-tetanus-poliomyelitis vaccine | 1.15 | | 2.46 | | 1.74 | |
|  | Polio vaccine | 0.54 | | 0.76 | | 0.76 | |
|  | Increase | 0.61 | | 1.70 | | 0.98 | |
| I | Combined diphtheria-pertussis-tetanus-poliomyelitis vaccine | 1.87 | | 5.65 | | 4.29 | |
|  | Polio vaccine | 0.54 | | 0.76 | | 0.76 | |
|  | Increase | 1.33 | | 4.89 | | 3.53 | |
| J | Combined diphtheria-pertussis-tetanus-poliomyelitis vaccine | 1.41 | | 5.66 | | 4.59 | |
|  | Polio vaccine | 1.00 | | 2.46 | | 2.46 | |
|  | Increase | 0.41 | | 3.20 | | 2.13 | |
| K | Combined diphtheria-pertussis-tetanus-poliomyelitis vaccine | 1.23 | 4.00 | 3.24 | 6.06 | 4.28 | 13.00 |
|  | Polio vaccine | 1.41 | 1.41 | 1.51 | 1.51 | 2.30 | 2.30 |
|  | Increase | (0.18) | (2.59) | 1.73 | 4.55 | 1.98 | 10.70 |

[1] Ratio of test serum to NIH reference serum (NIH requirements: Type I, 0.29; Type II, 0.25; and Type III, 0.16).

The results of tests for freedom of toxicity and animal safety are summarized in Table 4. With the exception of lot A, all of the four-component mixtures and control three-component preparations were found to meet the minimum requirements of the National Institutes of Health. Lot A was prepared from a pertussis concentrate subsequently shown to be highly toxic. Heat detoxification of pertussis concentrates eliminated this difficulty.

One lot of the four-component antigen (lot C) was tested for diphtheria and tetanus potency initially and

TABLE 4

*Tests for Freedom of Toxicity and Animal Safety*

For toxicity tests, each of 5 mice, weighing 14–16 gms., was injected intraperitoneally with ⅕ the total human dose. For a vaccine to be considered satisfactory, all the mice must survive, not show a weight loss after 3 days, and show a normal weight gain after 7 days.

For animal safety tests, each of 3 guinea pigs (300–400 gms.) was injected intraperitoneally (i.p.) with the total human dose of vaccine. Each of 3 mice (17–21 gms.) was injected i.p. with ½ ml. of vaccine. For a vaccine to be considered satisfactory, all the animals must have survived and not show significant symptoms for 7 days.

| Lot No. | Freedom of toxicity | | Animal safety | |
|---|---|---|---|---|
| | Combined diphtheria-pertussis-tetanus-poliomyelitis vaccine | Combined diphtheria-pertussis-tetanus vaccine | Combined diphtheria-pertussis-tetanus-poliomyelitis vaccine | Combined diphtheria-pertussis-tetanus vaccine |
| A | U | | U | |
| B | S | S | S | S |
| C | S | S | S | S |
| D | S | S | S | S |
| E | S | S | S | S |
| F | S | S | S | S |
| G | S | S | S | S |
| H | S | S | S | S |
| I | S | S | S | S |
| J | S | | S | |
| K | S | | S | |

Note.—U=Unsatisfactory, S=Satisfactory.

TABLE 5

*Stability of Diphtheria and Tetanus Toxoids in Combined Diphtheria-Pertussis-Tetanus-Poliomyelitis Vaccine*

The four-component vaccine lot C was held at 2–5° C. and tested periodically for diphtheria and tetanus potency. One and one-half ml. of vaccine was injected subcutaneously into 9 or 10 normal guinea pigs weighing 500 grams ±10%. The animals were bled after 4 weeks, and the serum pools were titrated for antitoxin by mixing with the appropriate test toxin and injecting the mixture into 2 guinea pigs.

| Storage period | Diphtheria toxoid | Tetanus toxoid |
|---|---|---|
| Original | [1] 4 | 5 |
| 6 months | 4 | 4 |
| 1 year | 4 | 4 |

[1] Antitoxin units/ml. (National Institutes of Health requirements: 2 units).

TABLE 6

*Stability of H. pertussis Vaccine in Combined Diphtheria-Pertussis-Tetanus-Poliomyelitis Vaccine and Combined Diptheria-Pertussis-Tetanus Vaccine*

(Vaccines stored at 2–5° C. were tested for pertussis potency in mice)

| Lot No. | Storage period | Combined diphtheria-pertussis-tetanus-poliomyelitis vaccine | Combined diphtheria-pertussis-tetanus vaccine |
|---|---|---|---|
| B | Original | [1] 15.5 | 22.2 |
| | 8 mos | 14.0 | |
| | 12 mos | | 14.5 |
| C | Original | 14.2 | 22.2 |
| | 6 mos | 6.0 | |
| | 8 mos | 11.0 | |
| | 12 mos | 9.0 | 14.5 |
| D | Original | 17.6 | 18.3 |
| | 8 mos | 20.0 | |
| | 12 mos | | 10.5 |
| F | Original | 17.4 | 13.8 |
| | 5 mos | 9 | |

[1] Protective units per total human dose (National Institutes of Health requirements: 8.0–36 units).

TABLE 7

*Stability of Poliomyelitis Vaccine in the Combined Diphtheria-Pertussis-Tetanus-Poliomyelitis Vaccine*

(Vaccines stored at 2–5° C. were tested in monkeys for polio potency)

| Lot No. | Storage period | Combined diphtheria-pertussis-tetanus-poliomyelitis vaccine | | | Poliomyelitis vaccine | | |
|---|---|---|---|---|---|---|---|
| | | Type I | Type II | Type III | Type I | Type II | Type III |
| C | 10 wks | [1] 0.71 | 4.28 | 1.52 | 0.33 | 0.61 | 0.38 |
| | 6 mos | 0.31 | 1.62 | 0.57 | | | |
| | 8 mos | 0.20 | 0.66 | 0.43 | | | |
| | 14.5 mos | 0.41 | 1.32 | 0.71 | | | |
| D | Original | 0.31 | 1.74 | 1.86 | 1.51 | 1.74 | 1.63 |
| | Do | 0.29 | 1.63 | 1.41 | 0.81 | 0.76 | 1.07 |
| | 12 mos | 0.57 | 2.14 | 0.76 | 0.62 | 2.00 | 0.76 |
| F | Original | 1.41 | 2.14 | 4.00 | 0.93 | 1.07 | 0.62 |
| | Do | 1.07 | 4.28 | 2.14 | 0.35 | 1.00 | 0.31 |
| | 12 mos | 1.23 | 3.73 | 1.32 | 1.15 | 18.6 | 0.71 |

[1] Ratio of test sera/control sera. (National Institutes of Health requirements: Type I, 0.29; Type II, 0.25; and Type III, 0.16).

Having thus described my invention, I claim:

1. In a method of preparing a combined poliomyelitis-diphtheria-tetanus-pertussis antigen, the steps which comprise mixing killed but antigenic poliomyelitis virus vaccine, diphtheria toxoid and tetanus toxoid with potassium alum, incorporating benzethonium chloride therein, adding alkali metal hydroxide thereby precipitating aluminum hydroxide and absorbing the poliomyelitis antigen, diphtheria antigen and tetanus antigen thereon, separately detoxifying pertussis organisms with heat, and incorporating the heat-detoxified pertussis organisms into the mixture containing said poliomyelitis, diphtheria and tetanus antigens.

2. In a method of preparing a combined poliomyelitis-diphtheria-tetanus-pertussis antigen, the steps which comprise mixing killed but antigenic polyiomyelitis virus vaccine and tetanus toxoid with alumina gel, incorporating benzethonium chloride therein, absorbing the poliomyelitis antigen and tetanus antigen on said alumina gel, separately heating pertussis organisms to a detoxifying temperature, continuing such heating for a time sufficient to detoxify said pertussis organisms, and incorporating diphtheria toxoid and the heat-detoxified pertussis organisms into the alumina gel.

3. In a method of preparing a combined poliomyelitis-diphtheria-tetanus-pertussis antigen, the steps which comprise mixing killed but antigenic poliomyelitis vaccine and tetanus toxoid with alumina gel, incorporating benzethonium chloride therein, retaining the resulting mixture for about 5–7 days at about room temperature, separately heating pertussis organisms to a detoxifying temperature, continuing such heating for a time sufficient to detoxify said pertussis organisms, and incorporating diphtheria toxoid and the heat-detoxified pertussis into the alumina gel.

4. In a method of preparing a combined poliomyelitis-diphtheria-tetanus-pertussia antigen, the steps which comprise mixing poliomyelitis vaccine, diphtheria toxoid and tetanus toxoid with potassium alum, incorporating benzethonium chloride therein, changing the pH of the solution to a value above about 7, thereby precipitating aluminum hydroxide gel and absorbing the poliomyelitis, diphtheria and tetanus antigens thereon, separately heating pertussis organisms to a detoxifying temperature, and incorporating the heat-detoxified pertussis organisms into the mixture containing said poliomyelitis, diphtheria and tetanus antigens.

5. In a method of preparing a combined poliomyelitis-diphtheria-tetanus-pertussis antigen, the steps which comprise mixing poliomyelitis vaccine, diphtheria toxoid and tetanus toxoid with potassium, alum, incorporating benzethonium chloride therein, adding NaOH in an amount to bring the pH of the solution to a value of about 7.1–7.2, thereby precipitating aluminum hydroxide gel and absorbing the poliomyelitis, diphtheria and tetanus antigens thereon, storing at about 35–37° C. for about 16–24 hours, separately heating pertussis organisms to a detoxifying temperature, continuing such heating for a time sufficient to detoxify said pertussis organisms, and incorporating the heat-detoxified pertussis organisms into the alumina gel mixture containing said poliomyelitis, diphtheria and tetanus antigens.

6. In a method of preparing a combined poliomyelitis-diphtheria-tetanus-pertussis antigen, the steps which comprise mixing diphtheria toxoid and tetanus toxoid with one another, said toxoids containing about one part in 40,000 of benzethonium chloride, adding a solution of poliomyelitis vaccine which serves as a diluent, incorporating benzethonium chloride into the resulting diluted mixture, adding alkali metal hydroxide to adjust the pH of the solution to about 7.1–7.2, thereby precipitating aluminum hydroxide and absorbing the poliomyelitis, diphtheria and tetanus antigens thereon, separately heating pertussis organisms to a detoxifying temperature, continuing such heating for a time sufficient to detoxify said pertussis organisms, and incorporating the heat-detoxified pertussis organisms into the alumina gel mixture containing said poliomyelitis, diphtheria and tetanus antigens.

7. In a method of preparing a combined poliomyelitis-diphtheria-tetanus-pertussis antigen, the steps which comprise mixing diphtheria toxoid and tetanus toxoid with a 1% solution of benzethonium chloride to provide a benzethonium chloride concentration of about 1:40,000, clearing by filtration, bringing to a temperature of about 20°–22° C., bringing poliomyelitis vaccine to about 20–22° C., adding said poliomyelitis vaccine to the combined diphtheria and tetanus toxoids, adding to the resulting mixture a 10% solution of potassium alum, in an amount to provide about 0.1 mg. of potassium alum per $L_f$ of toxoid, adding alkali metal hydroxide to provide a pH of about 7.1–7.2, thereby precipitating aluminum hydroxide and absorbing the poliomyelitis, diphtheria and tetanus antigens thereon, adding benzethonium chloride in an amount to provide a final concentration of about 1:40,000, storing under incubating conditions of time and temperature, separately heating pertussis to a detoxifying temperature, continuing such heating for a time sufficient to detoxify said pertussis, and incorporating the heat-detoxified pertussis into the alumina gel mixture containing said poliomyelitis, diphtheria and tetanus antigens.

References Cited in the file of this patent
UNITED STATES PATENTS
2,793,160     McLean _____ May 21, 1957

OTHER REFERENCES

Schuchardt et al.: Amer. J. Public Health, March 1960, pp. 321–328.

Li et al.: PSEBM, vol. 87, No. 1, October 1954, pp. 148–157.

Barrett: J.A.M.A., vol. 167, No. 9, June 28, 1958, pp. 1103–1107.

Batson: Pediatrics, vol. 21, pp. 1–6, January 1958.

Kendrick et al.: Am. J. Pub. Health, vol. 47, pp. 473–483 (April pt. 1), 1957.

Levine et al.: J. Immunol., vol. 79, August 1957, pp. 89–93, Ref. 7.

Stevenson: PSEBM, Aug.–Sept. 1956, pp. 764–767.